United States Patent
Sethuraman et al.

(10) Patent No.: US 10,360,645 B2
(45) Date of Patent: *Jul. 23, 2019

(54) INTEGRATING AN APPLICATION INTO OPERATING SYSTEM COMPONENTS OF A MOBILE COMPUTING PLATFORM

(71) Applicant: MICROSOFT TECHNOLOGY LICENSING, LLC, Redmond, WA (US)

(72) Inventors: Kaushik Sethuraman, Sammamish, WA (US); Vishal V. Ghotge, Seattle, WA (US); Taqi Jaffri, Kirkland, WA (US); Edward C Chung, Bellevue, WA (US); Gregory Alan Howard, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,679

(22) Filed: Sep. 12, 2018

(65) Prior Publication Data

US 2019/0012748 A1 Jan. 10, 2019

Related U.S. Application Data

(63) Continuation of application No. 13/304,555, filed on Nov. 25, 2011, now Pat. No. 10,147,145.

(51) Int. Cl.
- G06F 9/44 (2018.01)
- G06Q 50/00 (2012.01)
- G06F 9/445 (2018.01)

(52) U.S. Cl.
CPC ......... G06Q 50/01 (2013.01); G06F 9/44505 (2013.01)

(58) Field of Classification Search
None
See application file for complete search history.

(56) References Cited

U.S. PATENT DOCUMENTS

| 2007/0214454 A1* | 9/2007 | Edwards | G06F 16/957 717/176 |
| 2010/0144323 A1* | 6/2010 | Collins | G06Q 10/10 455/414.1 |

* cited by examiner

Primary Examiner — Shih-Wei Kraft
(74) Attorney, Agent, or Firm — Alleman Hall Creasman & Tuttle LLP (57) ABSTRACT

The subject disclosure is directed towards integrating an application into an operating system component of a mobile computing platform. The application communicates registration information to an extension mechanism within the mobile computing platform. The extension mechanism registers the application and modifies the operating system component to provide interoperability with the application based on the registration information. The extension mechanism couples the operating system component with content from a counterpart application to the application, which corresponds to information presented on the operating system component.

20 Claims, 7 Drawing Sheets

INTEGRATING AN APPLICATION INTO OPERATING SYSTEM COMPONENTS OF A MOBILE COMPUTING PLATFORM

CROSS REFERENCE TO RELATED APPLICATIONS

This application is a continuation of, and claims priority to previously filed U.S. patent application Ser. No. 13/304,555 filed on Nov. 25, 2011 entitled "Integrating An Application Into Operating System Components Of A Mobile Computing Platform", the subject matter of which is hereby incorporated by reference in its entirety.

BACKGROUND

Contemporary mobile phone platforms provide a user with access to various applications, such as social networking applications, which include electronic communication software (e.g., Skype® Voice over IP (VOIP)) and social network client software (e.g., Windows® Live Spaces), to enhance mobile device functionality. These applications may provide a mobile user with various mechanisms for interacting with and/or consuming content from people (e.g., friends and family) within a social network. For instance, the mobile user may view photos or status updates published by a friend on a profile and/or post a comment on the friend's status update or photo. The mobile user may also initiate a text, video and/or voice conversation with another friend over the Internet.

The mobile computing platform deploys some applications on pre-installed operating system components (e.g., Microsoft® Windows®-based phone hubs). In contrast, the mobile computing platform deploys other applications in isolated environments (e.g., sandboxes), which limits their native capabilities. As a result, the user experience with these applications, including those related to the social experience, is somewhat reduced.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards integrating an application into one or more operating system components of a mobile computing platform. Each operating system component may be an entity that forms a portion of the mobile computing platform and updated therewith. Conversely, the application is not a portion of the mobile computing platform and updated separately. In one aspect, an example operating system component may be known in the art as hubs (i.e., Microsoft® Windows® Phone hubs), portals or views, for example, among various other terms that facilitate interaction between the mobile computing platform and a mobile user.

In one aspect, an extension mechanism within the mobile computing platform processes registration information from the application. The registration information indicates which operating system components are to be extended as well as any parameters for requesting content. The extension mechanism modifies the one or more operating system components to provide interoperability with the application. For example, the extension mechanism may modify a representation or layout for each operating system component and designate a portion for viewing the content. The extension mechanism couples the one or more operating system components with the content from the application corresponding to information presented on the one or more operating system components.

In one aspect, an extension mechanism provides an interface for facilitating interoperability between the one or more operating system components and the application. Through such an interface, the application may register with the mobile computing platform, access the information being presented on the one or more operating system components and embed each operating system component with content that is from the application and/or corresponds to such information.

In one aspect, the application may also be permitted to access various user data corresponding to native software applications, such as contact data for the mobile user's contacts, in order to determine appropriate content of interest to the mobile user. In another aspect, the application may not be permitted to access the contact data in which case the application provides application information associated with each counterpart application entity and the extension mechanism compares the application information with the contact data in order to identify one or more common contacts. The extension mechanism may insert or embed the content associated with the one or more common contacts into sub-components of the one or more operating system components, which may include a contacts component.

In one aspect, the extension mechanism inserts a link to a function provided by the application into the one or more operating system components. The application may execute the function using one or more mobile device capabilities. In another aspect, the extension mechanism inserts a user interface control that, when activated by mobile user interaction, requests the content from the application using one or more parameters and navigates to either an operating system component page or an application page for presenting the content.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards integrating an application into one or more operating system components of a mobile computing platform. The one or more operating system components may include native software applications that are pre-installed on the mobile computing platform. The one or more operating system components may also be delivered within an update package for the mobile computing platform or, alternatively, via a software installation/update package that is downloaded from an online repository (e.g., an optional or custom component that is purchased or acquired freely from Microsoft® Windows® Phone Marketplace). Typically, each operating system component provides a mobile user with access to task-specific, trusted capabilities. The (sandboxed) application, on the other hand, operates in an isolated computing environment in order to maintain mobile device security and quality of service. An example application may complement an online social networking service, which provides data directly to a mobile device or to a server for the mobile device.

In one example implementation, an extension mechanism within a mobile computing platform provides an interface for managing interoperability between the one or more operating system components and the application. Through such an interface, the application may register with the mobile computing platform, access the information being presented on the one or more operating system components and couple each operating system component with content that corresponds to such information.

In one example implementation, the extension mechanism processes registration information from the application. The registration information indicates which operating system components are to be extended as well as parameters for requesting content. The extension mechanism modifies the one or more operating system components to provide interoperability with the application. For example, the extension mechanism may modify a representation or layout for each operating system component and designate a portion for viewing the content. The extension mechanism inserts the content into each designated portion of the one or more operating system components.

In one example implementation, the extension mechanism inserts a link referencing a function provided by the application into the one or more operating system components. The application may execute the function, such as a VOIP call, using one or more mobile device capabilities. In another example implementation, the extension mechanism inserts a user interface control that, when activated by mobile user interaction, directs the mobile computing platform to request the content from the application using one or more parameters and navigates to an operating system component page or an application page comprising the content. Alternatively, the mobile computing platform requests the content from the dedicated server, which stores the content and other application information.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and mobile user experiences in general.

Figure 1:
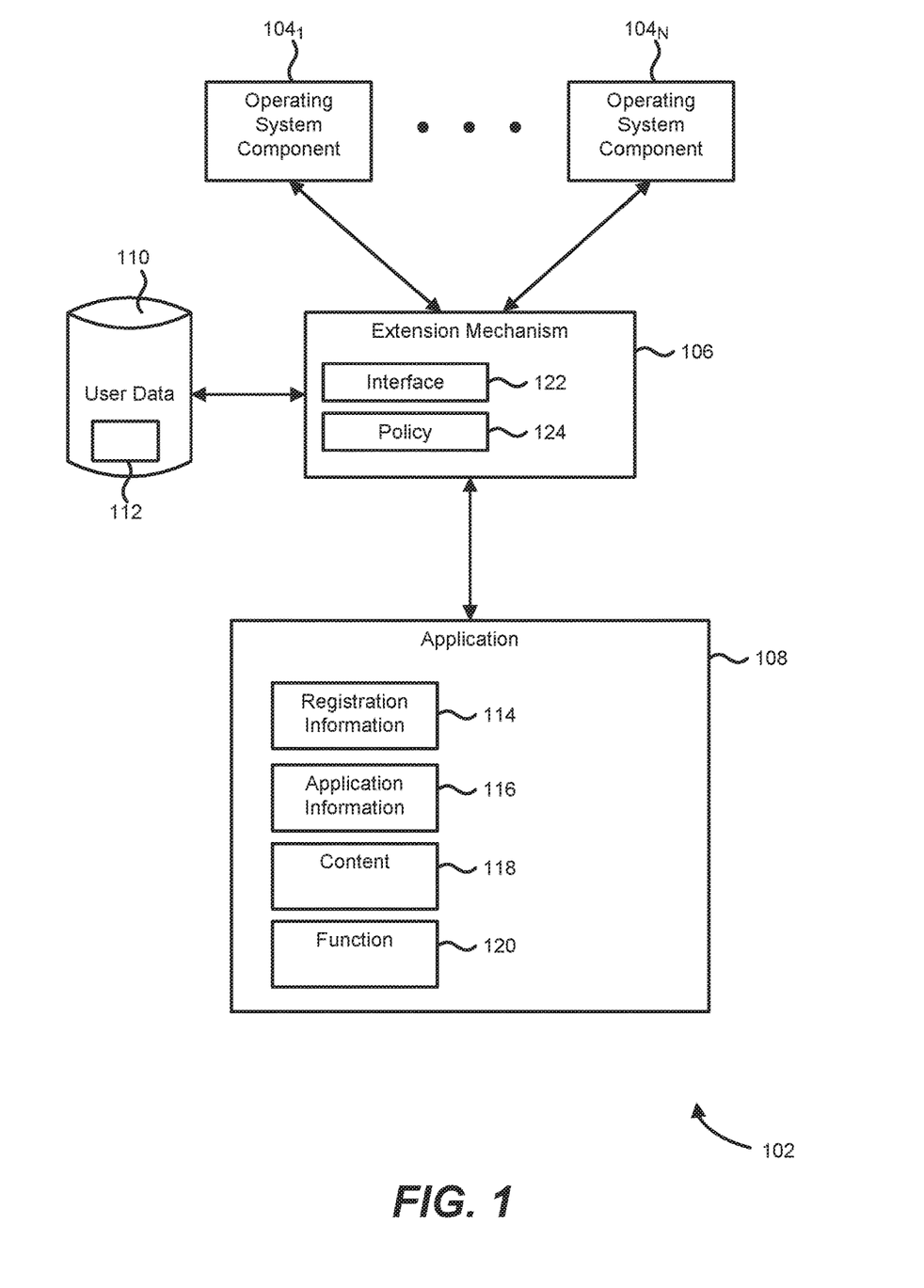
FIG. 1 is a block diagram illustrating an example system for integrating an application into one or more operating system components of a mobile computing platform according to one example implementation.

FIG. 1 is a block diagram illustrating an example system for integrating an application into one or more operating system components of a mobile computing platform according to one example implementation. Example components of the example system include a mobile computing platform 102, a plurality of operating system components $104_1 \ldots N$ (hereinafter referred to as the plurality of operating system components 104), an extension mechanism 106 and an application 108.

These components operate with each other to provide a mobile user with an enhanced mobile computing experience, including an enhanced social experience. In one example implementation, the mobile computing platform 102 provides an operating system, access to runtime services (e.g., database services, web or cloud-based services, Internet communication services, such as Representational State Transfer (REST) services, and/or the like), a managed application programming interfaces (APIs), mobile device capabilities and various other components on which the plurality of operating system components 104, the extension mechanism 106 and the application 108 run.

In one example implementation, the mobile user may store various user data 110, such as contact data 112, in one or more databases. The contact data 112 comprises information that is aggregated from different sources, which may include data entered in the mobile device, social networking websites, an email server (e.g., a Microsoft® Outlook® account), and/or other data service providers, according to one example implementation. Example contact data 112 may include first and last names, email addresses, instant messaging names, phone numbers, social networking user names, Microsoft® Live Identifiers (IDs), multiplayer online gaming handles and/or the like.

According to one example implementation, each of the plurality of operating system components 104 include a combination of user interface objects and controls, such as menus, fields (e.g., text fields), icons, navigation objects, buttons, widgets, links (e.g., hyperlink controls) and/or the like. The plurality of operating system components 104 may also implement various navigation objects (e.g., panorama controls, pivot applications and/or the like) that enable the mobile user to navigate between sub-components (e.g., panels, pages, and/or the like). Each operating system component may provide one or more related features that combine user-generated local content and online content from social networking services as described herein.

The plurality of operating system components 104 may also include user-defined, dynamic pages (e.g., Windows® Phone cards, filtered views and/or the like) for presenting information from native software applications and/or content from the application 108. The mobile user may add or remove links to applications, mobile device capabilities (e.g., a web browser component, a camera, a phone component and/or the like) and/or individual data items (e.g., individual contact data, web pages and/or media items). The mobile computing platform 102 may update these pages in real-time.

In one example implementation, the plurality of operating system components 104 may include a contacts component (e.g., a Microsoft® Windows®-based people hub), a places component (e.g., a Microsoft® Windows®-based places hub), a photo component (e.g., a Microsoft® Windows®-based picture hub), a game component, a music/video component, a marketplace component, a productivity software component (e.g., a Microsoft® Windows®-based Office hub) and/or the like. Each of these components may be task-specific. For example, the contacts component presents the contact data 112 and various associated content that is aggregated from multiple data sources, including online community services (e.g., social networking websites, such as Facebook®, Linkedin® and/or the like), messaging/conversation services (e.g., Skype® and/or the like), blogs, email services and/or the like. The contacts component may also include a news feed sub-component (e.g., a what's new feed) that aggregates blog posts, wall posts, status updates, comments and/or the like published by one or more contacts. The contacts component may also display the mobile user's social network status, profile picture and/or wall.

Example components of the application 108 include registration information 114, application information 116, content 118 and a function set 120 comprising one or more functions. In one example implementation, the registration information 114 may include a manifest file that stores details about the application 108, such as an application identifier (i.e., AppID) and one or more mobile device capabilities being used by the application 108. The manifest file may define elements, tags, and attributes in a markup language (e.g., Extensible Markup Language (XML)). Some of these elements may describe a layout for application pages (e.g., Tiles). Other elements may specify one or more extensions that the application 108 supports. The registration information 114 may also specify content (i.e., captions) that may appear in an operating system component portion (e.g., a pivot page or a quick card) for each relevant extension of the contact data 112.

In one example implementation, the application information 116 describes various entities of counterpart applications to the application 108 on other computing devices, which may include people who are also contacts of the mobile user. The counterpart applications may be associated with an online or web service, such as a social networking service, on which the various entities publish information as users or account holders. Alternatively, these entities may not be users, but may publish information to the social networking service or may be subjects of information published through the application 108.

As described herein, the application information 116 may be compared with the contact data 112 in order to identify one or more persons whom the mobile user and the counterpart applications to and/or the social networking service for the application 108 have in common. In one implementation, the application information 116 may be secured within hash values in order to prevent a disclosure of private entity information. It is appreciated that the hash values may be generated using any hash technique/function, such as secure hash algorithm (SHA-1) and/or the like. It is also appreciated that other techniques for securing the application information 116 are envisioned by the present disclosure and may be employed by various implementations.

The extension mechanism 106 may couple the content 118 to one or more of the plurality of operating system components 104. In one example implementation, the content 118 may include published information provided by the application 108. In another implementation, the extension mechanism 106 may insert a user interface control, such as a link or a button, which references a function of the function set 120 and/or a page that displays the content 118. The function set 120 may include a native capability implementation for the application 108, such as a function for making a VOIP call, commenting on a contact's status, sending a group event invitation and/or the like. When the mobile user interacts with the user interface control, the mobile computing platform 102 launches the application 108 and directs a corresponding operating system component to an application page or an operating system component page.

As described herein, the contact data 112 may be used to identify a common contact. The application 108 may generate the content 118 that may otherwise not be accessible to the plurality of operating system components 104 because the common contact is not associated with the mobile user on the application 108. The mobile user, for example, may converse with the common contact through e-mail, but may not be connected to the same common contact via a social network website. Therefore, the mobile user may not be able to view published information associated with the common contact on the social network website.

In one example implementation, the extension mechanism 106 may augment information presented on one or more of the plurality of operating system components 104 with the published information to enhance the mobile user experience. For example, the extension mechanism 106 may couple a current map indicating the mobile user's location with the common contact's comments regarding nearby restaurants. As another example, the extension mechanism 106 may insert an upcoming birthday for the common contact into a news feed sub-component. As yet another example, the extension mechanism 106 may update a profile for the common contact with the social network username.

The extension mechanism 106 may also modify the profile to include a link that launches a social network mobile application, which executes an invitation function for adding the common contact as a connection (e.g., a friend). Alternatively, the extension mechanism 106 may launch the social network application (e.g., via Microsoft® App Connect) with an instruction to execute a query with one or more parameters (e.g., in a deep link URI (Uniform Resource Locator)). The social network mobile application may communicate the query to the social network website and retrieve query results to be presented on an application page (e.g., a primary or secondary tile) and/or an operating system component page (e.g., a quick card or a filtered view that is navigable from a pivot or panorama application).

As described herein, various implementations of the extension mechanism 106 enable interoperability between the plurality of operating system components 104 and the application 108. The extension mechanism 106 includes an interface 122 through which the application 108 may register with the mobile computing platform 102 and may couple one or more of the plurality of operating system components 104 with the content 118 that corresponds to information presented on each operating system component. The interface 122 may implement a design pattern (e.g., a Model-View-ViewModel (MVVM) design pattern) that separates a data model from an operating system component representation (e.g., a view layout). The extension mechanism 106 may parse parameter types from the registration information 114 and create the data model. The design pattern implementation also includes a view model that connects the data model with the operating system component representation. The view model includes objects that store the content 118, which updates designated portions of the operating system component representation when the content 118 changes.

The extension mechanism 106 also includes a policy 124, such as a security policy, that governs access rights for the application 108. For example, the policy 124 may determine which data stores (e.g., a music or photos database) may be accessed by the application 108. In one example implementation, the policy 124 permits the application 108 to access to the user data 110 in entirety or specific portions thereof. For example, the application 108 may access only the contact data 112. As another example, the application 108 may be granted access to any combination of location data, calendar data, photo data, gaming data, music/video data and/or the like. Alternatively, the policy 124 may direct the mobile computing platform 102 to deny the application 108 access to some or all of the user data 110 including any personal data associated with the mobile user (e.g., an e-mail address, a phone number, an online game account identifier and/or a social networking user name).

Figure 2A:
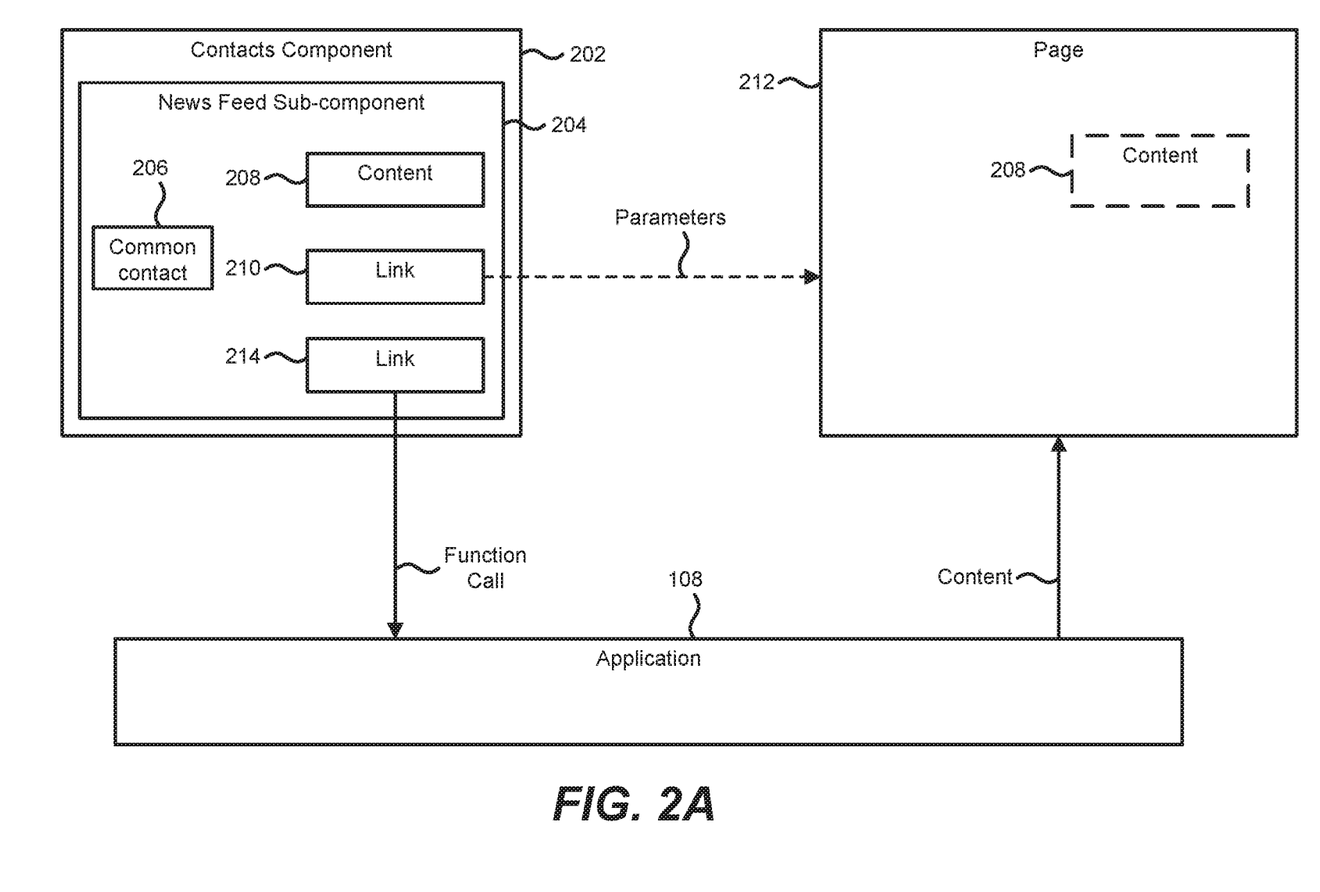
FIG. 2A is a block diagram is illustrating an example contacts component that is interoperable with an application according to one example implementation.

FIG. 2A is a block diagram is illustrating an example contacts component, such as a contacts component 202, that is interoperable with an application according to one example implementation. The contacts component 202 is an operating system component that may include one or more sub-components, such as a news feed sub-component 204 according to one example implementation. The news feed sub-component 204 may present various information to a mobile user, which may be aggregated from social networking services and/or counterpart applications to the application 108. For instance, the news feed sub-component 204 may include status updates or recent comments by the common contact 206 or other mobile user contacts, which were published on a website associated with the social networking service.

In one example implementation, the extension mechanism 106 in conjunction with the mobile computing platform 102 modifies a representation of the contacts component 202 to create space for content 208. For example, a layout of the news feed sub-component 204 is extended by designating a portion for displaying the content 208. The content 208 may correspond to the information presented on the contacts component 202. For example, the content 208 may include recent checked-in venues on a location-based social networking website that correlate with the status updates of the common contact 206. In addition to surfacing the checked-in venues in the news feed sub-component 204, the application 108 may match each checked-in venue with one or more related status updates based with time stamps. As another example, the content 208 may indicate that the common contact 206 is scheduled to attend an upcoming event that the mobile user plans to attend.

In another example implementation, the application 108 may communicate an alert to the mobile device that the common contact 206 has additional information stored remotely. The extension mechanism 106 responds by inserting a link 210 (e.g., a hyperlink (user interface) control) into the news feed sub-component 204. The link 210 references a page 212 (e.g., a filtered view or a quick card on a tile, such as a Windows® Phone live tile) for viewing the content 208 to which a mobile device navigates the mobile user. The page 212 may be an operating system component page within the contacts component 202 or an application page outside of the contacts component 202.

The link 210 may direct the mobile device to the operating system component page using various implementations of a navigation user interface control (e.g., a pivot application or a panorama application). Alternatively, the link 210 may launch the application 108 using one or more parameters, which searches proprietary data stores and creates the application page to display search results. As an example, the link 210 may be a deep link URl that includes the one or more parameters. Each parameter may refer to a category of information being stored in the proprietary data stores. An example parameter may specify another contact or an event (e.g., a lecture) about which the mobile user desires recent comments published by the common contact 206.

In an alternative example implementation, the extension mechanism 106 inserts a link 214 directing the mobile device to an application function. When the mobile user activates the link 214 (e.g., by clicking on a hyperlink), the mobile device may launch the application 108 using a suitable function call or, alternatively, communicates the function call to the application 108 or one or more components of the application 108 running in a background of a mobile computing platform. For example, the application 108 may provide communication capabilities that allow the mobile user to converse with the common contact 206. When the mobile user initiates the function call, the application 108 may start a voice over IP call or send an instant message to a computing device owned by the common contact 206. As another example, the application 108 may be a group event management program that adds the common contact 206 to an invited list for an event being organized by the mobile user.

Figure 2B:
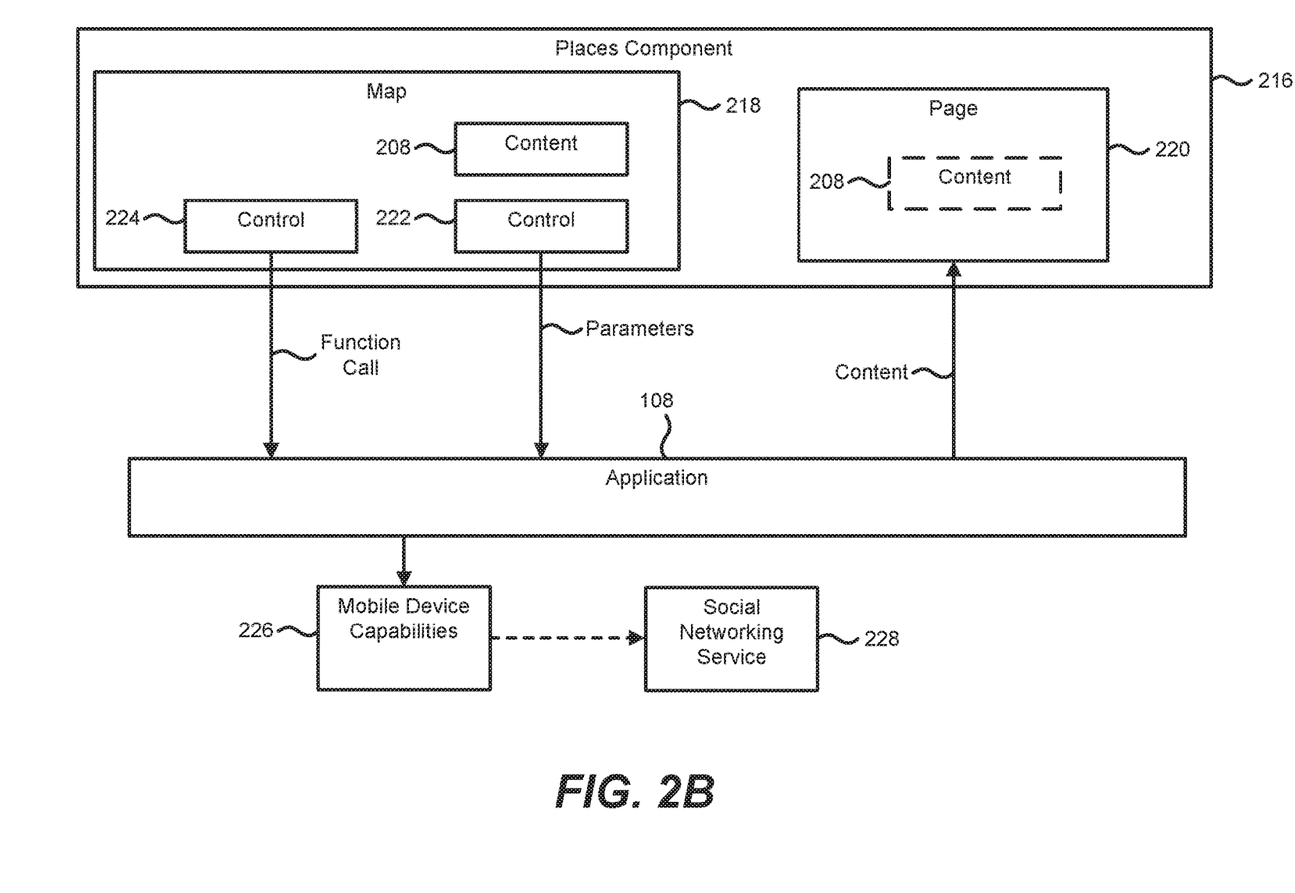
FIG. 2B is a block diagram illustrating an example places component that is interoperable with an application according to one example implementation.

FIG. 2B is a block diagram is a block diagram illustrating an example places component that is interoperable with an application according to one example implementation. A places component 216 includes a map 218 and a page 220 for viewing the content 208. The map 218 refers to a geographical representation of a three-dimensional component. The map 218 may depict a current location of the mobile user or another location that is of interest. The page 220 is depicted as an operating system component page but may be an application page in an alternative implementation, as described in FIG. 2A. The places component 216 may be modified to allocate viewing space for the content 208 in the map 218.

Similar to the contacts component 202, the content 208 may correspond to information presented on the map 218. In one example implementation, the content 208 may be associated with one or more contacts. For instance, the map 218 may depict a restaurant for which the mobile user desires to read reviews by the one or more contacts. Alternatively, the content 208 may not be associated with the one or more contacts. The mobile user may accordingly request reviews from anyone who dined at the restaurant.

In one alternative implementation, the map 218 may include a control (i.e., a user interface control) that, when activated, navigates to the page 220 for viewing the content 208. In response to user interaction with the control 222, the extension mechanism 106 uses one or more parameters to request the content 208 from the application 108. These parameters may include search parameters for one or more proprietary data stores. During registration, the application 108 establishes one or more parameter types with an interface provided by the extension mechanism 106. Each parameter type may be a category of information under the purview of the application 108.

For example, if the application 108 is a portal to a restaurant review management website, an example parameter type may include a restaurant category, such as coffee shop. The application 108 presents information about coffee shops within a certain radius of the mobile user. Optionally, the application 108 may mesh the map 218 with such information at each coffee shop location. Another example parameter type may specify a restaurant name about which the mobile user desires recent comments or reviews. Using a location based social networking service, the mobile user may also desire to know which contacts checked-in to the restaurant recently.

In another example implementation, the map 218 may include another (user interface) control 224 that a function provided by the application 108. When activated, the control 224 invokes the function by issuing a function call. The application 108 may execute the function using one or more mobile device capabilities 226 (e.g., a web browser, a phone service, a camera and/or the like). For example, the application 108 may access a web service, such as a social networking service 228, through a networking capability, which facilitates function execution. If the mobile user decides to write a review about the restaurant, the application 108 may communicate the review to the social networking service 228, which publishes the review.

Figure 3:
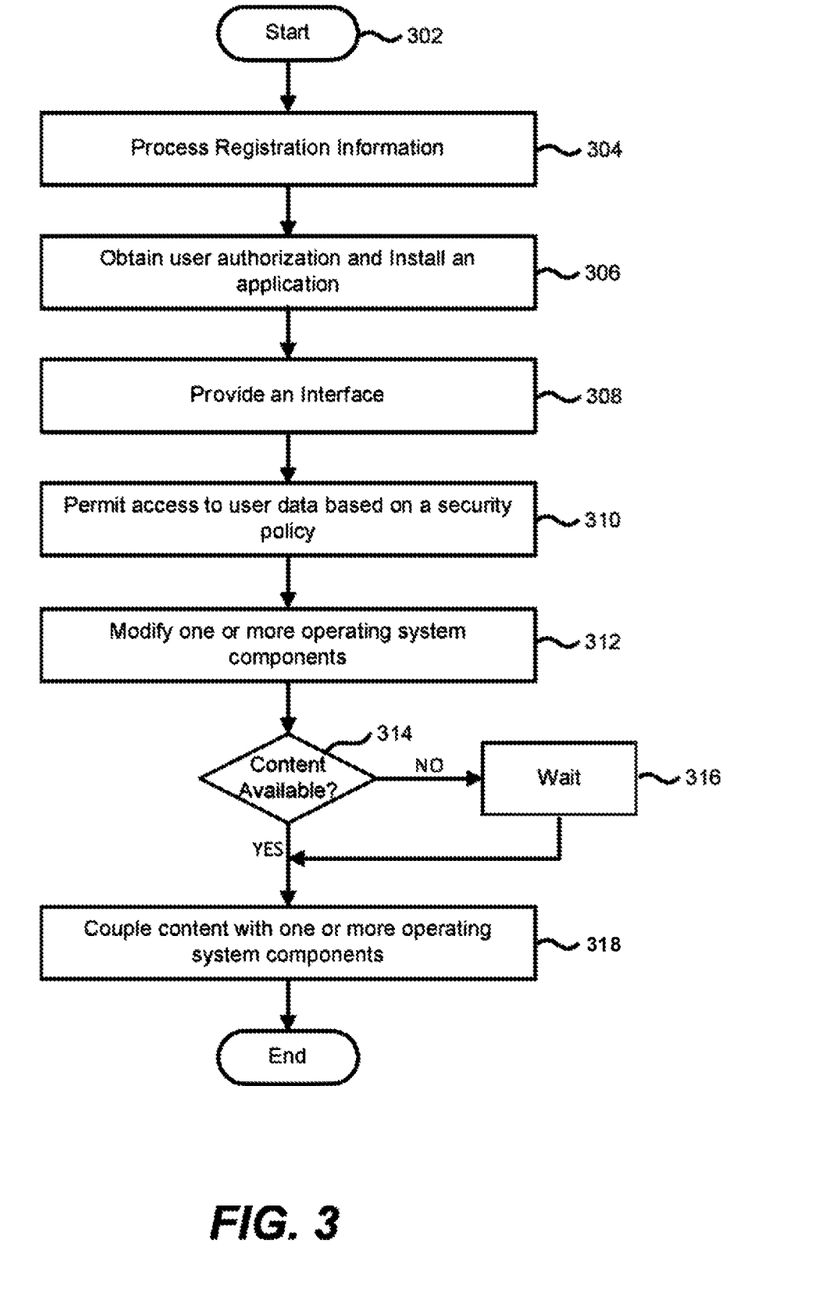
FIG. 3 is a flow diagram illustrating example steps for integrating an application into one or more operating system components of a mobile computing platform according to one example implementation.

FIG. 3 is a flow diagram illustrating example steps for integrating an application into one or more operating system components of a mobile computing platform according to one example implementation. Steps depicted in FIG. 3 may be performed by the extension mechanism 106. These steps commence at step 302 and proceed to step 304 at which the extension mechanism 106 processes registration information. In one example implementation, the extension mechanism 106 extracts various elements establishing which operating system component(s) to extend with content from an application, such as the application 108 of FIG. 1. These elements may specify operating system component names, operating system, sub-component names, parameter types and/or the like. For example, the elements may extend a news feed sub-component of a contacts component with content that corresponds to information being presented on the news feed sub-component.

Step 306 refers to obtaining user authorization and installing the application on the mobile computing platform. In one example implementation, the extension mechanism 106 prompts a mobile user for permission to install the application and to grant access rights to various user data. The access rights determine which portions of the user data may be examined by the application. After installing the application, the extension mechanism 106 may store the access rights in a security policy. Alternatively, other mechanisms for registering already installed applications may be employed.

Step 308 is directed to providing an interface for coupling the content to one or more of the operating system components. Step 310 is directed to permitting access to the user data based on the security policy. Step 312 represents modifying the one or more operating system components. In one example implementation, a mobile computing platform provides a set of interface functions that enable the extension mechanism 106 to designate a portion for displaying the content within a layout of each operating system component.

Step 314 represents a determination as to whether content from the application is available. In one example implementation, the application communicates a message indicating the availability of the content from a social networking service that corresponds to information being presenting on the one or more operating system component pages. If the content is available, step 314 proceeds to step 318. If the content is not available, step 314 proceeds to step 316 and waits for the content to become available. When the application provides the content components, step 316 proceeds to step 318.

Step 318 depicts coupling the one or more operating system components with the content from the application. In one example implementation, the extension mechanism 106 may insert the content into an operating system sub-component. In another example implementation, the extension mechanism 106 may create a user interface control, such as a link, that references an operating system component page or an application page for viewing the content. In an alternative example implementation, the extension mechanism 106 may insert a link that, when activated, directs the application to execute a function. Step 316 terminates the steps described in FIG. 3.

Figure 4:
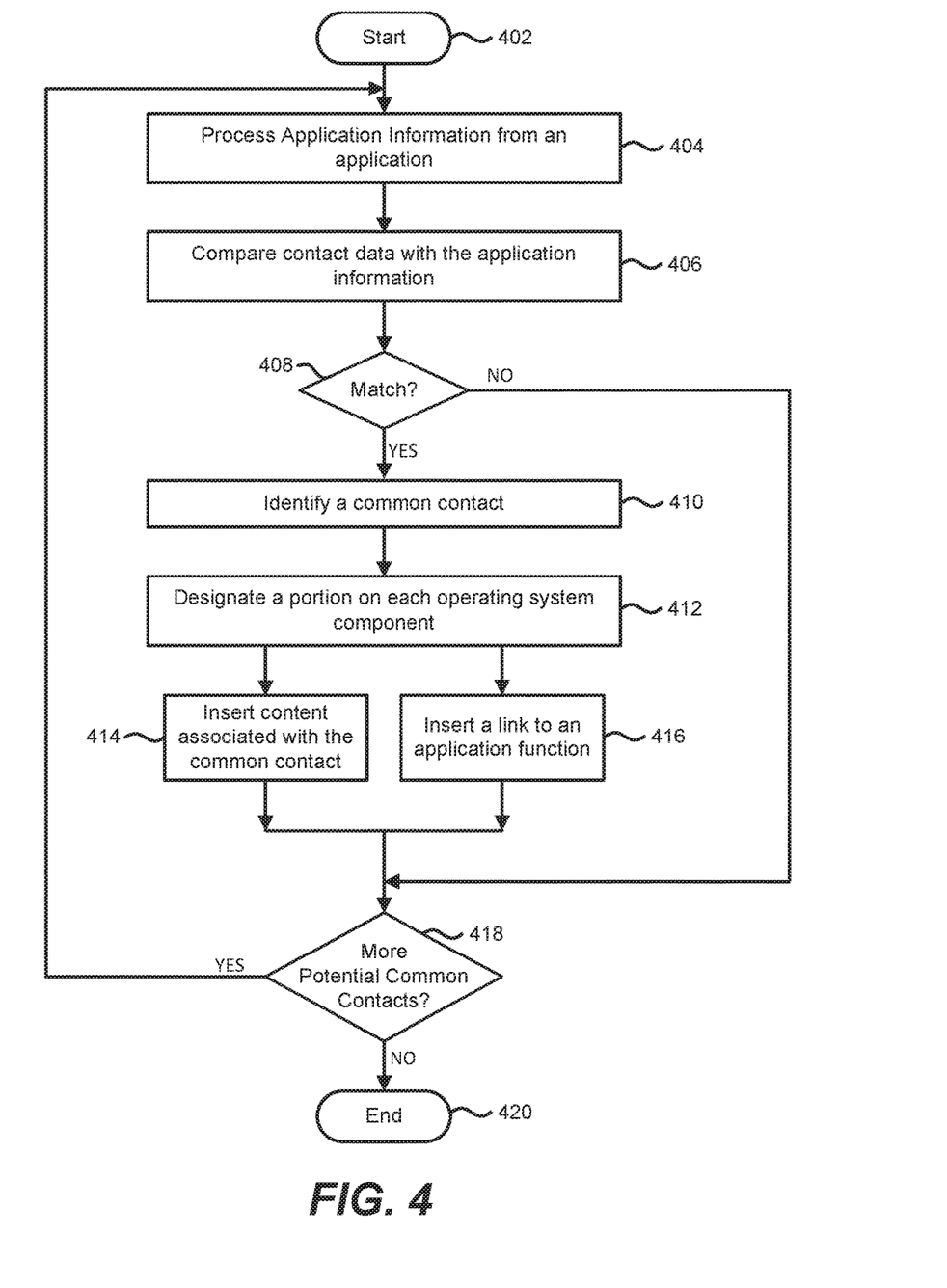
FIG. 4 is a flow diagram illustrating example steps for extending one or more operating system components with content and/or functionality from an application according to one example implementation.

FIG. 4 is a flow diagram illustrating example steps for extending one or more operating system components with content and/or functionality from an application according to one example implementation. Steps depicted in FIG. 4 may be performed by the extension mechanism 106. These steps commence at step 402 and proceed to step 404 when the extension mechanism 106 processes application information from an application. In one implementation, the application may be launched for the purpose of determining if there is any content and/or functionality to be surfaced in the one or more operating system components. In another implementation, the application may be running as background agent. The application information may include various data under the purview of the application. For example, the application information may also refer to users of the application.

Step 406 is directed to comparing contact data with the application information. For example, the application information may include a full name, a login name, email address or a phone number associated with an application user. In one implementation, the application information may be provided in a secure manner that allows the extension mechanism 108 to perform the comparison while maintaining the application user's privacy. For example, the application (or a server component associated with the application) may compute a hash value (e.g., a one-way hash value) that represents a portion of the application information, such as the email address. This hash value is compared with hash values associated with corresponding portions of the contact data to determine whether there is a contact with an identical hash value.

Step 408 determines whether the application information matches a portion of the contact data. In one implementation, the extension mechanism 108 compares the hash value for the email address with hash values corresponding to various portions of the contact data to identify a contact's email address having a matching hash value. In an alternative implementation, the extension mechanism 108 is provided with an unsecure copy of the email address and employs any pattern matching technique to identify a contact having a same or similar email address. If there is a match, step 408 proceeds to step 410. Step 410 represents identifying a common contact between the mobile device and the application. If there is no match, step 408 proceeds to step 418.

Step 412 refers to designating a portion of each operating system component for coupling the content. In one example implementation, the extension mechanism 106 modifies a representation of each operating system component to provide viewable space for the content and proceeds to step 414 and/or step 416. Step 414 refers to inserting content associated with the common contact. Step 416 refers to inserting a link to a function provided by the application. Step 418 decides whether there are more potential common contacts. If there are more application user to compare with the contact data, step 418 returns to step 404. If there are no more application user to compare with the contact data, step 418 proceeds to step 420. Step 420 terminates the steps described in FIG. 4.

Figure 5:
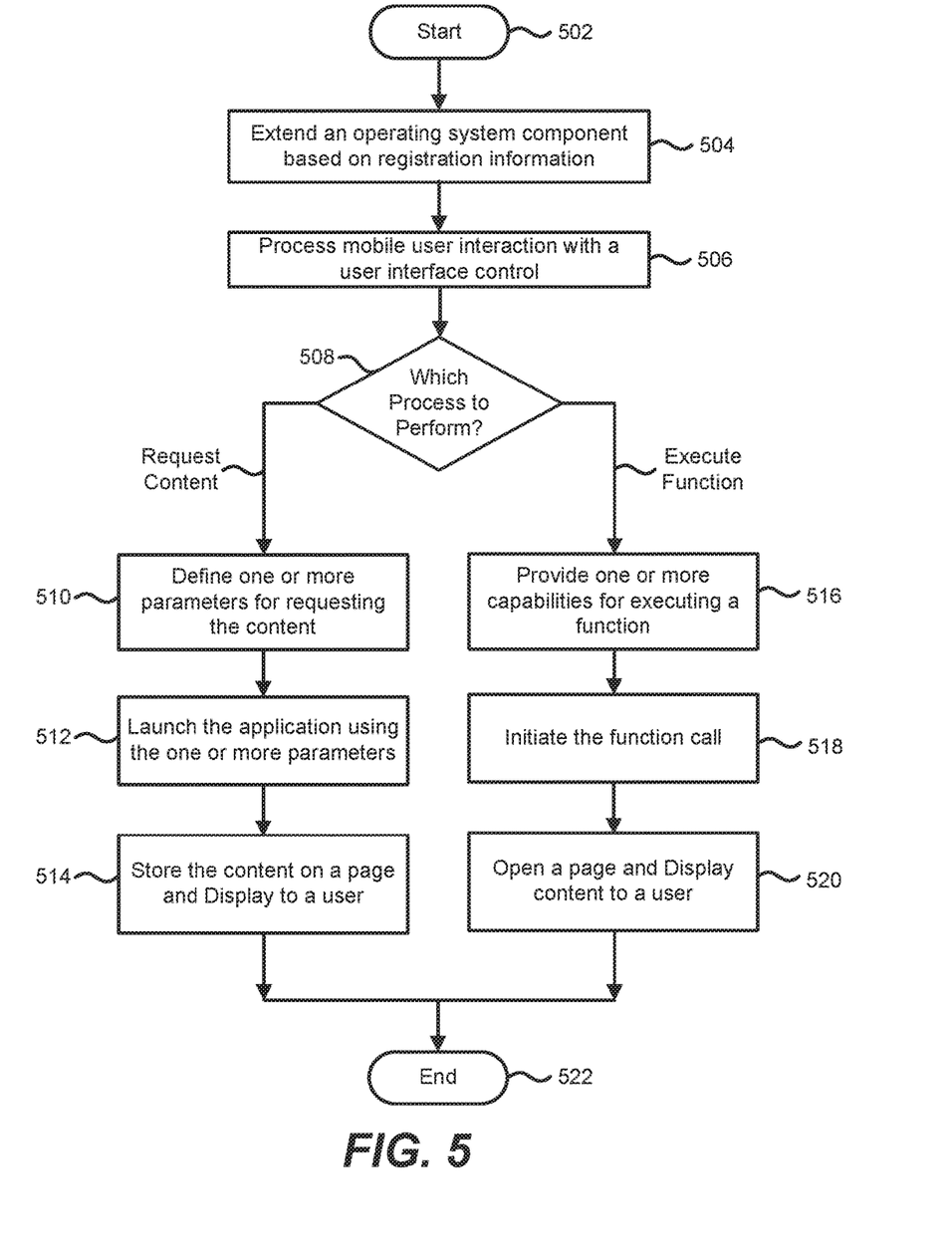
FIG. 5 is a flow diagram illustrating example steps for navigating to a page comprising content from an application according to one example implementation.

FIG. 5 is a flow diagram illustrating example steps for navigating to a page comprising content from an application according to one example implementation. Steps depicted in FIG. 5 may be performed by the extension mechanism 106. These steps commence at step 502 and proceed to step 504 where the extension mechanism 106 extends an operating system component based on registration information. After completing step 504, the application 108 is permitted to access contact data and insert a user interface control (e.g., a link or a button) and/or content into the operating system component.

Step 506 is directed to processing user interaction with the user interface control. In one example implementation, a mobile user clicks the link or the button, which directs the mobile computing platform to either request content or execute a function provided by the application. In one example implementation, the content is stored by the application or a dedicated server associated with the mobile device. For example, the application may provide the content to the dedicated server as part of the registration process. Step 508 refers to a determination as to which process to perform for coupling the content to the operating system component. If the mobile computing platform is to request the content, step 508 proceeds to step 510, which is followed by step 512 and step 514. If the mobile computing platform is to execute the content, step 508 proceeds to step 516, which is followed by step 518 and step 520.

Step 510 is directed to defining one or more parameters for requesting the content. For example, the operating system component may include a calendar enumerating past and upcoming appointments, meetings and/or other events. Via the user interface control, the application may indicate to the mobile user that there is additional information associated with an upcoming event. Accordingly, the mobile user activates the user interface control, which requests the additional information. An example parameter for the request may be an event identifier for a group event management application. Another example parameter may include a professional with which the mobile user has an appointment and desires to read reviews by contacts who used the same professional. Step 512 refers to launching the application using the one or more parameters. The application may communicate the request to a web service, which queries one or more proprietary databases and returns the requested content. Step 514 represents storing the content on a page and displaying the content to the mobile user. For example, the content may indicate that one of the mobile user's contacts is scheduled to attend the upcoming event. Step 514 proceeds to step 522 at which the steps described in FIG. 5 terminate.

Step 516 refers to providing one or more capabilities for executing the function. The application may define the one or more capabilities within the registration information. These capabilities may include networking capabilities (e.g., an Internet or data connection), phone operations, storage capabilities, camera capabilities for recording video data and/or photo data, voice recorder capabilities for storing sound data, web browser capabilities and/or the like. For example, the application may utilize the camera capability to record a message for a common contact and the networking capability to communicate the message. Step 518 refers to initiating the function call, which instructs the application to perform the function. Step 520 is directed to opening an application page that includes a user interface and content provided by the application. For example, a voice/video over IP application may call the common contact, open a conversation with typical options (e.g., volume control) and send voice/video data to the common contact. Step 522 terminates the steps described in FIG. 5.

Figure 6:
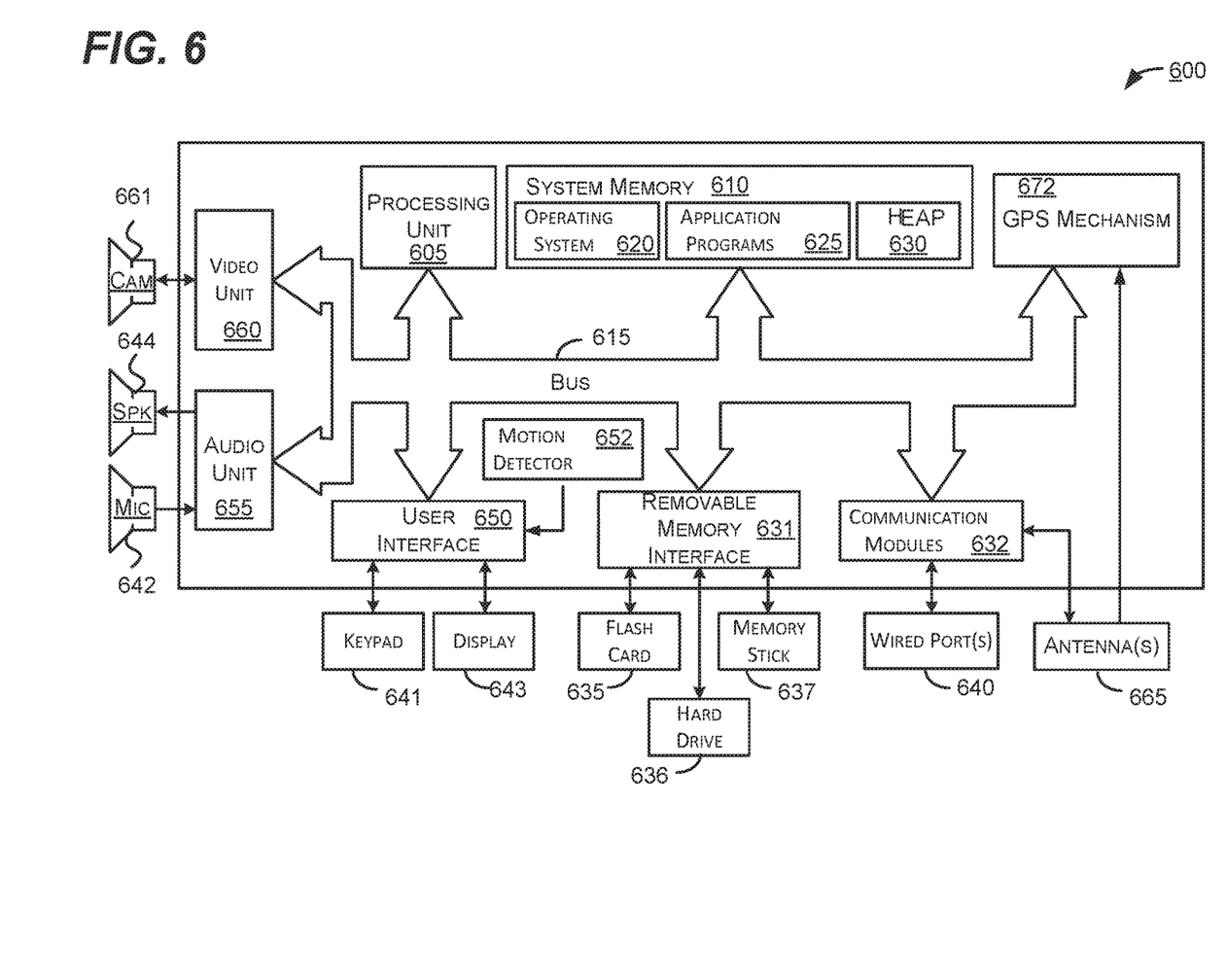
FIG. 6 illustrates an example of a suitable mobile device 600 on which aspects of the subject matter described herein may be implemented.

FIG. 6 illustrates an example of a suitable mobile device 600 on which aspects of the subject matter described herein may be implemented. The mobile device 600 is only one example of a device and is not intended to suggest any limitation as to the scope of use or functionality of aspects of the subject matter described herein. Neither should the mobile device 600 be interpreted as having any dependency or requirement relating to any one or combination of components illustrated in the example mobile device 600.

With reference to FIG. 6, an example device for implementing aspects of the subject matter described herein includes a mobile device 600. In some embodiments, the mobile device 600 comprises a cell phone, a handheld device that allows voice communications with others, some other voice communications device, or the like. In these embodiments, the mobile device 600 may be equipped with a camera for taking pictures, although this may not be required in other embodiments. In other embodiments, the mobile device 600 may comprise a personal digital assistant (PDA), hand-held gaming device, notebook computer, printer, appliance including a set-top, media center, or other appliance, other mobile devices, or the like. In yet other embodiments, the mobile device 600 may comprise devices that are generally considered non-mobile such as personal computers, servers, or the like.

Components of the mobile device 600 may include, but are not limited to, a processing unit 605, system memory 610, and a bus 615 that couples various system components including the system memory 610 to the processing unit 605. The bus 615 may include any of several types of bus structures including a memory bus, memory controller, a peripheral bus, and a local bus using any of a variety of bus architectures, and the like. The bus 615 allows data to be transmitted between various components of the mobile device 600.

The mobile device 600 may include a variety of computer-readable media. Computer-readable media can be any available media that can be accessed by the mobile device 600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 610 includes computer storage media in the form of volatile and/or nonvolatile memory and may include read only memory (ROM) and random access memory (RAM). On a mobile device such as a cell phone, operating system 620 is sometimes included in ROM although, in other embodiments, this is not required. Similarly, application programs 625 are often placed in RAM although again, in other embodiments, application programs may be placed in ROM or in other computer-readable memory. The heap 630 provides memory for state associated with the operating system 620 and the application programs 625. For example, the operating system 620 and application programs 625 may store variables and data structures in the heap 630 during their operations.

The mobile device 600 may also include other removable/non-removable, volatile/nonvolatile memory. By way of example, FIG. 6 illustrates a flash card 635, a hard disk drive 636, and a memory stick 637. The hard disk drive 636 may be miniaturized to fit in a memory slot, for example. The mobile device 600 may interface with these types of non-volatile removable memory via a removable memory interface 631, or may be connected via a universal serial bus (USB), IEEE bus, one or more of the wired port(s) 640, or antenna(s) 665. In these embodiments, the removable memory devices 635-637 may interface with the mobile device via the communication module(s) 632. In some embodiments, not all of these types of memory may be included on a single mobile device. In other embodiments, one or more of these and other types of removable memory may be included on a single mobile device.

In some embodiments, the hard disk drive 636 may be connected in such a way as to be more permanently attached to the mobile device 600. For example, the hard disk drive 636 may be connected to an interface such as parallel advanced technology attachment (PATA), serial advanced technology attachment (SATA) or otherwise, which may be connected to the bus 615. In such embodiments, removing the hard drive may involve removing a cover of the mobile device 600 and removing screws or other fasteners that connect the hard drive 636 to support structures within the mobile device 600.

The removable memory devices 635-637 and their associated computer storage media, discussed above and illustrated in FIG. 6, provide storage of computer-readable instructions, program modules, data structures, and other data for the mobile device 600. For example, the removable memory device or devices 635-637 may store images taken by the mobile device 600, voice recordings, contact information, programs, data for the programs and so forth.

A user may enter commands and information into the mobile device 600 through input devices such as a key pad 641 and the microphone 642. In some embodiments, the display 643 may be touch-sensitive screen and may allow a user to enter commands and information thereon. The key pad 641 and display 643 may be connected to the processing unit 605 through a user input interface 650 that is coupled to the bus 615, but may also be connected by other interface and bus structures, such as the communication module(s) 632 and wired port(s) 640. Motion detection 652 can be used to determine gestures made with the device 600.

A user may communicate with other users via speaking into the microphone 642 and via text messages that are entered on the key pad 641 or a touch sensitive display 643, for example. The audio unit 655 may provide electrical signals to drive the speaker 644 as well as receive and digitize audio signals received from the microphone 642.

The mobile device 600 may include a video unit 660 that provides signals to drive a camera 661. The video unit 660 may also receive images obtained by the camera 661 and provide these images to the processing unit 605 and/or memory included on the mobile device 600. The images obtained by the camera 661 may comprise video, one or more images that do not form a video, or some combination thereof.

The communication module(s) 632 may provide signals to and receive signals from one or more antenna(s) 665. One of the antenna(s) 665 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 672. In turn, the GPS mechanism 672 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 600 may connect to one or more remote devices. The remote devices may include a personal computer, a server, a router, a network PC, a cell phone, a media playback device, a peer device or other common network node, and typically includes many or all of the elements described above relative to the mobile device 600.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising, integrating an application into an operating system component of a mobile computing platform, including:
   permitting the application to access contact data presented on the operating system component;
   coupling the operating system component with content that is provided by the application and is associated with an entity who is a common contact of a counterpart application to the application by:
      comparing the contact data with application information to identify the common contact including identifying one or more persons with whom a mobile user of the mobile computing platform and the counterpart application have in common,
      inserting the content associated with the common contact into a sub-component of the operating system component, wherein the operating system component includes at least one of a contacts component or a places component,
      inserting a user interface control into the sub-component of the operating system component, and
      navigating to the sub-component in response to mobile user interaction with the mobile computing platform; and
   launching the application in response to interaction with the user interface control.

2. The method of claim 1 further comprising in response to interaction with the user interface control, executing a function using one or more mobile device capabilities.

3. The method of claim 1, wherein coupling the operating system component with the content further comprises directing the mobile computing platform to request the content from the application.

4. The method of claim 1, wherein coupling the operating system component with the content further comprises combining user-generated local content with the content from the application.

5. The method of claim 1, wherein coupling the operating system component with the content further comprises inserting a link into the operating system component that, when activated, presents the content on an application page.

6. The method of claim 1 further comprising providing an interface to manage interoperability between the operating system component and the application.

7. A computing device comprising:
   at least one processor;
   a memory communicatively coupled to the at least one processor; and
   an extension mechanism, stored in the memory and executed by the at least one processor, to:
      permit an application to access contact data presented on an operating system component of a mobile computing platform;
      couple the operating system component with content that is provided by the application and is associated with an entity who is a common contact of a counterpart application to the application by comparing the contact data with application information to identify the common contact including identifying one or more persons with whom a mobile user of the mobile computing platform and the counterpart application have in common, inserting the content associated with the common contact into a sub-component of the operating system component, wherein the operating system component includes at least one of a contacts component or a places component, inserting a user interface control into the sub-component of the operating system component, and navigating to the sub-component in response to mobile user interaction with the mobile computing platform; and
      launch the application in response to interaction with the user interface control.

8. The computing device of claim 7, wherein the extension mechanism, in response to interaction with the user interface control, executes a function using one or more mobile device capabilities.

9. The computing device of claim 7, wherein the extension mechanism directs the mobile computing platform to request the content from the application.

10. The computing device of claim 7, wherein the extension mechanism combines user-generated local content with the content from the application.

11. The computing device of claim 7, wherein the extension mechanism inserts a link into the operating system component that, when activated, presents the content on an application page.

12. The computing device of claim 11, wherein the content on the application page corresponds to information presented on one or more operating system components.

13. The computing device of claim 7, wherein the extension mechanism provides an interface for managing interoperability between the operating system component and the application.

14. One or more computer-readable storage memories having computer-executable instructions executed to perform steps comprising:
   permitting an application to access contact data presented on an operating system component of a mobile computing platform;
   coupling the operating system component with content that is provided by the application and is associated with an entity who is a common contact of a counterpart application to the application and of a mobile user of the mobile computing platform by:
  comparing the contact data with application information to identify the common contact including identifying one or more persons with whom the mobile user and the counterpart application have in common,
  inserting the content associated with the common contact into a sub-component of the operating system component, wherein the operating system component includes at least one of a contacts component or a places component,
  inserting a user interface control into the sub-component of the operating system component, and
  navigating to the sub-component in response to mobile user interaction with the mobile computing platform; and
launching the application in response to interaction with the user interface control.

15. The one or more computer-readable storage memories of claim 14 having further computer-executable instructions comprising:
  in response to interaction with the user interface control, executing a function using one or more mobile device capabilities.

16. The one or more computer-readable storage memories of claim 14 having further computer-executable instructions comprising:
  directing the mobile computing platform to request the content from the application.

17. The one or more computer-readable storage memories of claim 14 having further computer-executable instructions comprising:
  combining user-generated local content with the content from the application.

18. The one or more computer-readable storage memories of claim 14 having further computer-executable instructions comprising:
  inserting a link into the operating system component.

19. The one or more computer-readable storage memories of claim 18 having further computer-executable instructions comprising:
  presenting the content to an application page when the link is activated.

20. The one or more computer-readable storage memories of claim 14 having further computer-executable instructions comprising:
  providing an interface to manage interoperability between the operating system component and the application.

* * * * *